United States Patent
Fukushima (10) Patent No.: US 9,054,443 B2
(45) Date of Patent: Jun. 9, 2015

(54) CONNECTOR HAVING A CASE WITH A RIB WITH A GROOVE ENGAGING A RIB WITH PROTRUSIONS ON A HOUSING

(71) Applicant: YAZAKI CORPORATION, Tokyo (JP)

(72) Inventor: Hirotaka Fukushima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/016,654

(22) Filed: Sep. 3, 2013

(65) Prior Publication Data

US 2014/0004743 A1     Jan. 2, 2014

Related U.S. Application Data (63) Continuation of application No. PCT/JP2012/056045, filed on Mar. 2, 2012.

(30) Foreign Application Priority Data

Mar. 4, 2011   (JP) .................. 2011-048332

(51) Int. Cl.
  *H01R 13/64*   (2006.01)
  *H01R 13/516*   (2006.01)
  (Continued)

(52) U.S. Cl.
  CPC .............. *H01R 13/516* (2013.01); *H01R 13/64* (2013.01); *H01R 4/26* (2013.01); *H01R 13/5045* (2013.01);
  (Continued)

(58) Field of Classification Search
  CPC ........................................................ H01R 13/64

USPC .................................................. 439/677–681
See application file for complete search history.

(56) References Cited

U.S. PATENT DOCUMENTS 4,111,514 A * 9/1978 Brishka et al. ................ 439/680
4,229,064 A * 10/1980 Vetter et al. ................... 439/680
(Continued)

FOREIGN PATENT DOCUMENTS

CN         200972933 Y     11/2007
CN         201041866 Y      3/2008
(Continued)

OTHER PUBLICATIONS

International Search Report for PCT/JP2012/056045 dated Jun. 13, 2012 [PCT/ISA/210].
(Continued)

*Primary Examiner* — Chandrika Prasad
(74) *Attorney, Agent, or Firm* — Sughrue Mion, PLLC (57) ABSTRACT

A connector includes a connecter housing and a case. A housing fixing portion of the case includes a first rib which extends in a circumferential direction of the housing fixing portion. The connector housing includes a second rib which extends in a circumferential direction. An inner circumferential groove which extends in the circumferential direction is formed on an inner circumferential face of the first rib. Vertical protrusions which extend in an inserting direction of the second rib into the inner circumferential groove are formed at a plurality of positions on at least one of vertical side walls defining the inner circumferential groove. Top parts of the vertical protrusions are deformed so as to engage the second rib with the inner circumferential groove when the second rib is inserted into the inner circumferential groove.

8 Claims, 6 Drawing Sheets

(51) Int. Cl.
   *H01R 13/504*      (2006.01)
   *B60L 11/18*       (2006.01)
   *H01R 4/26*        (2006.01)
   *H01R 107/00*      (2006.01)
(52) U.S. Cl.
   CPC ......... *H01R 2107/00* (2013.01); *H01R 2201/26* (2013.01); *B60L 11/1818* (2013.01); *Y02T 10/7005* (2013.01); *Y02T 90/14* (2013.01)

(56) References Cited

U.S. PATENT DOCUMENTS

| | | | |
|---|---|---|---|
| 6,123,569 | A | 9/2000 | Fukushima et al. |
| 6,371,768 | B1 | 4/2002 | Neblett et al. |
| 7,736,196 | B1 * | 6/2010 | Isaac et al. ............ 439/680 |
| 7,878,866 | B1 | 2/2011 | Kwasny et al. |
| 8,025,536 | B1 * | 9/2011 | Kelly ..................... 439/681 |
| 8,747,166 | B2 * | 6/2014 | Yamada et al. ......... 439/680 |
| 2006/0025021 | A1 * | 2/2006 | Ishizaki et al. ......... 439/677 |
| 2008/0090442 | A1 | 4/2008 | Wu et al. |
| 2008/0124983 | A1 | 5/2008 | Sundermeier |
| 2008/0268725 | A1 | 10/2008 | Kuo et al. |
| 2009/0017671 | A1 | 1/2009 | Liao |
| 2011/0026098 | A1 | 2/2011 | Komatsu |
| 2012/0003861 | A1 | 1/2012 | Kwasny et al. |

FOREIGN PATENT DOCUMENTS

| | | |
|---|---|---|
| CN | 101188336 A | 5/2008 |
| CN | 201113042 Y | 9/2008 |
| CN | 102394427 A | 3/2012 |
| DE | 10 2006 055 534 B3 | 1/2008 |
| JP | 9-161884 A | 6/1997 |
| JP | 2008-171748 A | 7/2008 |
| JP | 2008-198554 A | 8/2008 |

OTHER PUBLICATIONS

Written Opinion for PCT/JP2012/056045 dated Jun. 13, 2012 [PCT/ISA/237].

Office Action dated Nov. 20, 2014 issued by Japanese Patent Office in counterpart Japanese Patent Application No. 2011-048332.

Communication dated Mar. 13, 2015 issued by the State Intellectual Property Office of the People's Republic of China in counterpart Chinese Patent Application No. 201280011586.0.

* cited by examiner

CONNECTOR HAVING A CASE WITH A RIB WITH A GROOVE ENGAGING A RIB WITH PROTRUSIONS ON A HOUSING

CROSS REFERENCE TO RELATED APPLICATIONS

This application is a continuation of PCT application No. PCT/JP2012/056045, which was filed on Mar. 2, 2012 based on Japanese Patent Application (No. 2011-048332) filed on Mar. 4, 2011, the contents of which are incorporated herein by reference.

BACKGROUND OF THE INVENTION

1. Field of the Invention

The present invention is related to a connector and more particularly to a charging connector for an electric motor vehicle that accommodates and fixes a connector housing in a case without a backlash.

2. Description of the Related Art

There is known a charging connector which includes a charging connector housing fitted to a housing of a vehicle side connector and a case having a case main body accommodating and fixing the charging connector without a backlash (see PTL1).

Figure 5:
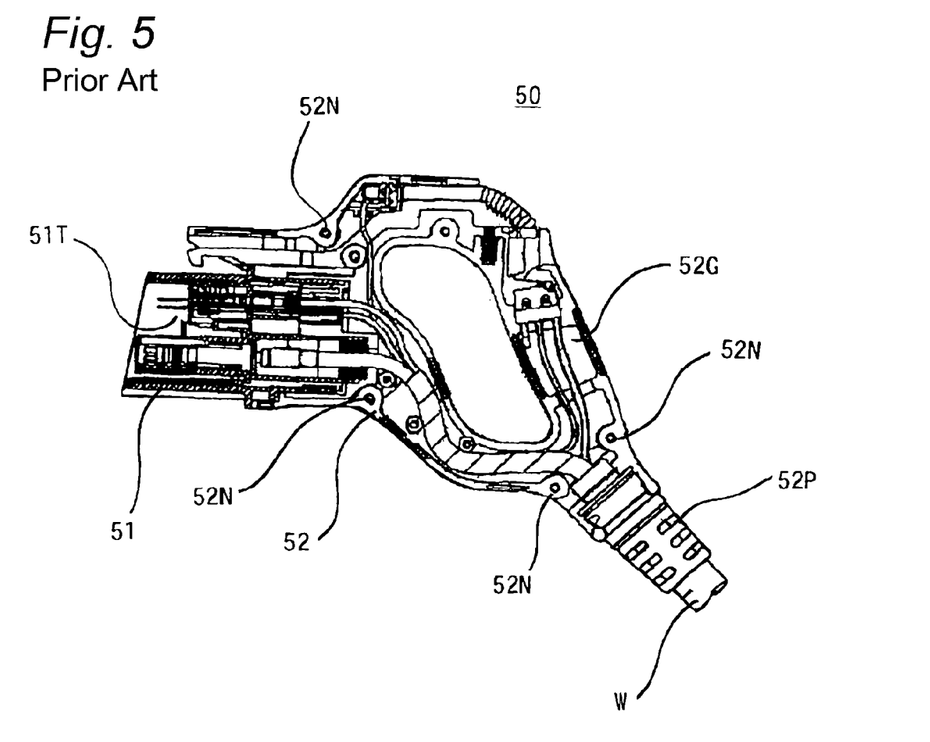
FIG. 5 is a sectional view of a charging connector disclosed in PTL1.

FIG. 5 is a sectional view of a charging connector disclosed in the PTL1. In FIG. 5, a charging connector housing 51 formed with a synthetic resin insulator has a cylindrical shape and a terminal accommodating part 51T is provided in an inner part of the cylindrical shape. The terminal accommodating part 51T is inserted into a terminal accommodating part of a vehicle side connector as a mating side connector.

A case 52 is formed by a pair of separated cases 52a and 52b. Screw insert holes 52N are provided respectively in butting edge parts and fastened and fixed by screws. In the case 52, a grip 52G is formed in a rear part and a cable W is connected to a lower end of the rear part through a cable protector 52P.

A rear half part of the charging connector housing 51 is fixed to the case 52. In order to fix the charging connector housing 51 to the case 52 without a backlash, protrusions as shown in FIG. 6 are provided between the charging connector housing 51 and the case 52 that fixes the charging connector housing 51.

Figure 6:
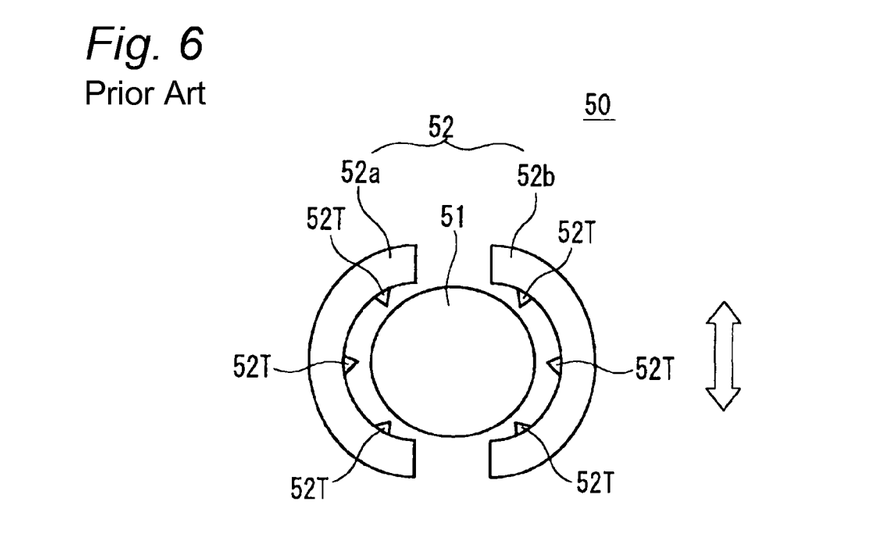
FIG. 6 is a longitudinally sectional conceptual view of a part in which a charging connector housing shown in FIG. 5 is held by a case.

FIG. 6 is a longitudinally sectional conceptual view of a part in which the charging connector housing shown in FIG. 5 is held by a case main body. In FIG. 6, the charging connector 50 includes the charging connector housing 51 fitted to a vehicle side connector housing and the case 52. As an assembly of the charging connector 50, the cylindrical charging connector housing 51 is held by the right and left semicircular cylindrical separated cases 52a and 52b to fix the charging connector housing 51. At this time, in inner circumferential faces of the right and left separated cases 52a and 52b, a plurality of triangular protrusions 52T are respectively formed at equal intervals. Thus, when the charging connector housing 51 is held between the right and left separated cases 52a and 52b, the triangular protrusions 52T abut on the outer periphery of the charging connector housing 51 to prevent a movement (backlash) thereof.

In the conventional charging connector, the triangular protrusions 52T are provided as described above to prevent the backlash between the charging connector housing 51 and the case 52. However, in a case where the backlash is completely eliminated, the height of the triangular protrusions 52T is increased to increase an amount of lap. Since the triangular protrusions 52T are formed in a circumferential direction, a height of the triangular protrusions 52T is excessively increased, so that the right and left separated cases 52a and 52b are not completely closed. Thus, a gap is formed between the cases. When the gap is formed, a problem arises in view of quality and design.

CITATION LIST

Patent Literature

[PTL1] JP-A-9-161884

SUMMARY OF THE INVENTION

It is therefore one advantageous aspect of the present invention to provide a connector which can prevent a backlash between a connector housing and a case and does not form a gap between a pair of separated cases so that the separated cases are completely closed.

According to one advantage of the invention, there is provided a connector comprising:

a connector housing having a cylindrical shape and configured to be fitted to a mating housing; and a case including a housing fixing portion having a cylindrical shape therein, wherein the housing fixing portion includes a first rib which extends in a circumferential direction of the housing fixing portion and is formed on an inner circumferential face of the housing fixing portion, the connector housing includes a second rib which extends in a circumferential direction of the connector housing and is formed on an outer circumferential face of the connector housing, an inner circumferential groove which extends in the circumferential direction of the housing fixing portion is formed on an inner circumferential face of the first rib, so that the second rib is inserted into the inner circumferential groove, and vertical protrusions which extend in an inserting direction of the second rib are formed at a plurality of positions on at least one of vertical side walls defining the inner circumferential groove, so that top parts of the vertical protrusions are deformed so as to engage the second rib with the inner circumferential groove when the second rib is inserted into the inner circumferential groove.

A plurality of axial protrusions which extend in an axial direction of the housing fixing portion may be formed in a plurality of positions on the inner circumferential face of the first rib so as to prevent a backlash between the connector housing and the case.

The connector may be configured such that: an axial groove extending in the axial direction of the housing fixing portion is formed in the inner circumferential face of the first rib; and an axial rib extending in the axial direction is formed the outer circumferential face of the connector housing so as to be engaged with the axial groove.

The connector may be configured such that: the first rib and the inner circumferential groove are provided in entire inner circumference of the housing fixing portion; and the second rib is provided in entire outer circumference of the housing connector.

The case may be formed by a pair of separated cases.

According to the present invention, the backlash between the connector housing and the case can be prevented.

According to the invention, when the separated cases are completely closed, a gap is not formed between case main bodies.

According to the invention, a circumferential backlash between the connector housing and the case is prevented.

DETAILED DESCRIPTION OF THE EXEMPLARY EMBODIMENTS

Now, a connector according to the present invention which can prevent a backlash of a connector housing and a case and does not form a gap between right and left separated cases when right and left separated cases are completely closed will be described below by referring to the drawings.

Figure 1:
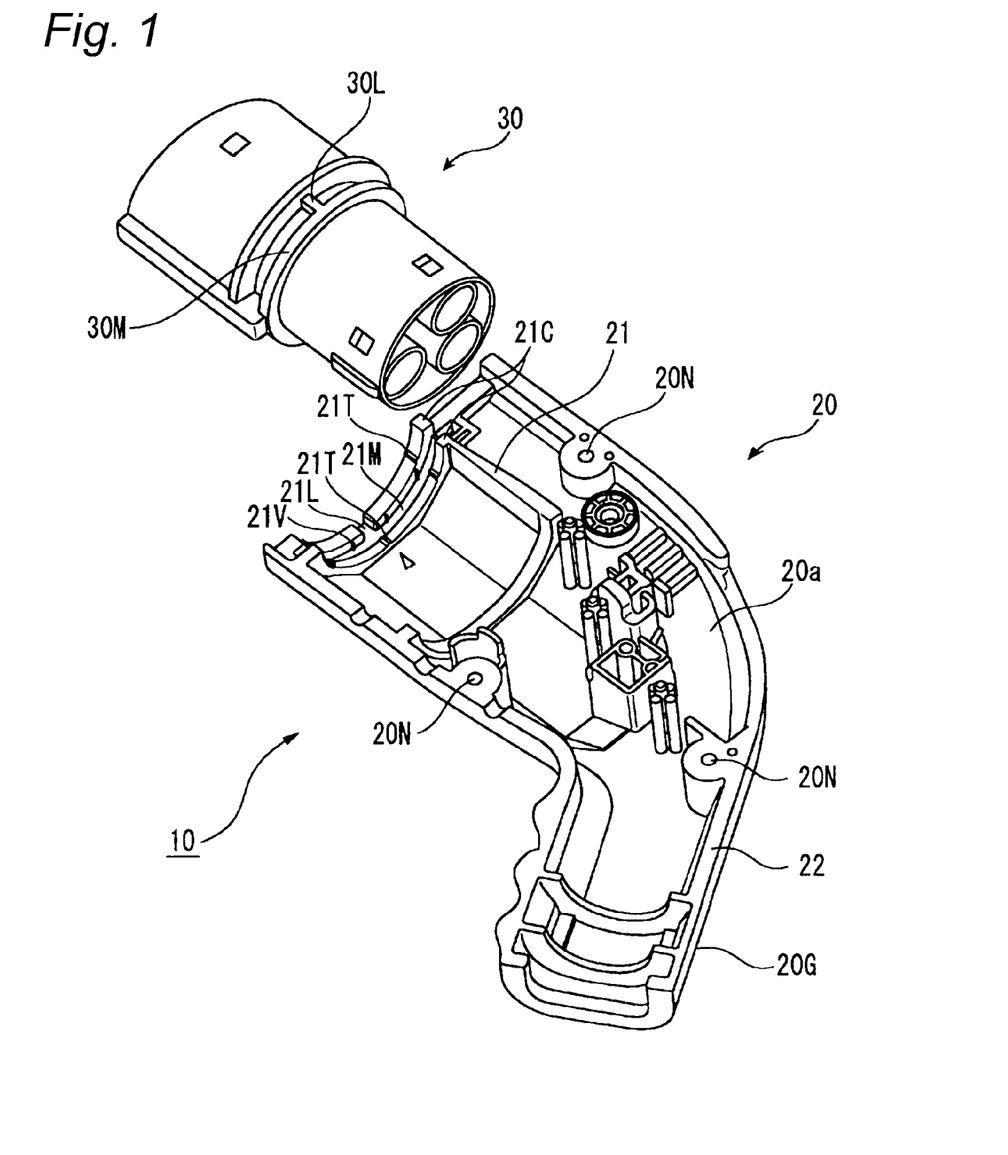
FIG. 1 is a perspective view showing a state that a case having a housing fixing portion is separated from a charging connector housing fixed to the housing fixing portion.

A charging connector 10 (a connector) according to the present invention includes, as shown in FIG. 1, a case 20 and a charging connector housing 30 (a connector housing).

The case 20 includes a cylindrical housing fixing portion 21 which accommodates and fixes the charging connector housing 30 and a handle part 22 which an operator grips during a charging operation. An entire part of the case 20 is divided into two in the longitudinal direction by right and left separated cases 20a and 20b (separated cases). In FIG. 1, only one separated case 20a is shown. The separated cases 20a and 20b are not limited to be divided into right and left sides and may be divided into upper and lower sides. When the separated cases 20a and 20b are assembled, the charging connector housing 30 is held by the housing fixing portions 21 provided in both the separated cases and screws are screwed to tapped holes 20N formed both in the separated cases to fix the charging connector housing 30 to the housing fixing portion 21.

Now, the case 20 and the charging connector housing 30 will be described below.

Figure 2:
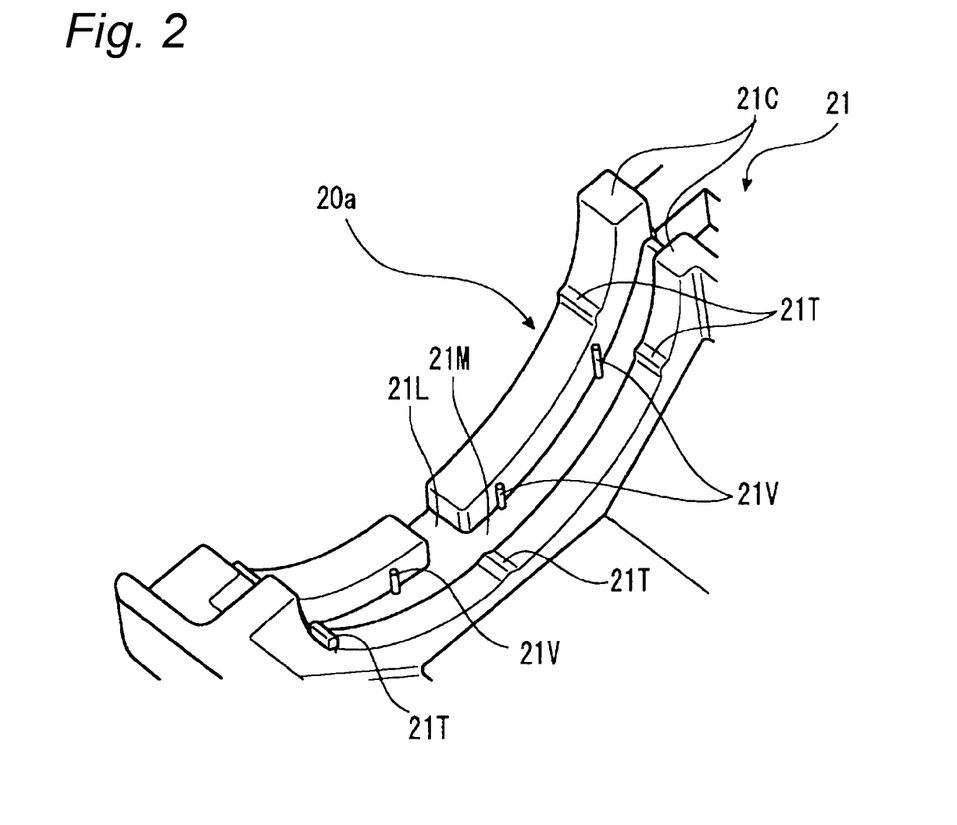
FIG. 2 is an enlarged perspective view of the housing fixing portion of the case.

FIG. 2 is an enlarged perspective view of a part of the housing fixing portion 21 of the case 20. Thick rib 21C (a first rib) having a thick part formed in an outer edge side of the housing fixing portion 21 is formed over entire circumference. In inner circumferential face of the thick rib 21C, axial protrusions 21T as triangular protrusions are formed in a plurality of parts which extend in the axial direction to prevent a backlash between the charging connector housing 30 and the housing fixing portion 21.

Further, in the vicinity of an intermediate part in the axial direction of the inner circumferential face of the thick rib 21C, an inner circumferential groove 21M is formed which is extended over entire circumference of the inner circumferential face. The inner circumferential groove 21M includes both vertical side walls and a bottom part that connects both the side walls together. The height of both the vertical side walls (that is, a depth of the inner circumferential groove 21M) is a little larger than the height of a circumferential rib 30M (a second rib) formed on an outer face of the charging connector housing 30. An axial length J of the bottom part is slightly larger than an axial thickness D of the circumferential rib 30M (J>D).

On at least one side wall of both the vertical side walls, vertical protrusions 21V which extend in an inserting direction of the circumferential rib 30M of the charging connector housing 30 are formed at a plurality of positions. As a form of the vertical protrusion 21V, a form may be employed such as a cylindrical shape, a semicircular cylindrical shape, a square pole or the like that protrudes toward the inside of the inner circumferential groove 21M from the side wall. A height H of the vertical protrusion 21V protruding from the side wall is set in such a way that a difference obtained by subtracting the height H from the axial length J of the bottom part of the inner circumferential groove 21M is slightly smaller than the axial thickness D of the circumferential rib 30M.

Namely, a relation expressed by "J>D>(J−H)" is established.

Further, in the separated cases 20a and 20b respectively, an axial groove 21L which passes to the inner circumferential groove 21M from an outer side of the thick rib 21C is formed in one part at a central part of the inner circumferential face of the thick rib 21C. An axial length of the axial groove 21L is equal to the axial length (thickness) of an axial rib 30L (FIG. 3) formed on the outer face of the charging connector housing 30. Further, a transverse width of the axial groove 21L is equal to a circumferential length (a transverse width) of the axial rib 30L.

Figure 3:
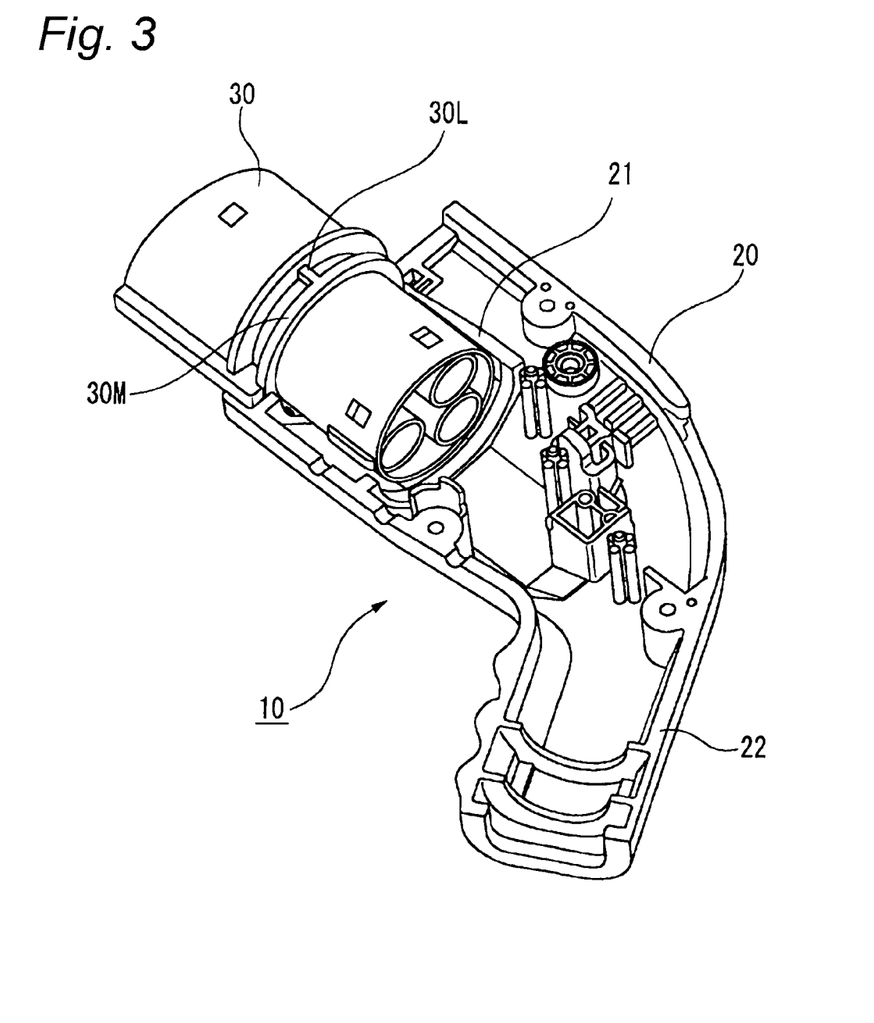
FIG. 3 is a perspective view showing a state that the charging connector housing is fixed to the housing fixing portion of the case.

FIG. 3 is a perspective view showing a state that the charging connector housing 30 is fixed to the housing fixing portion 21 of the separated case 20a. In FIG. 3, the charging connector housing 30 has a cylindrical shape. On the outer periphery of the charging connector housing 30, the circumferential rib 30M and the axial rib 30L are respectively formed in such a way as described below so as to correspond to the axial protrusions 21T, the inner circumferential groove 21M, the vertical protrusions 21V and the axial groove 21L formed on the housing fixing portion 21.

Substantially at a central part in the axial direction of the cylindrical charging connector housing 30, the circumferential rib 30M is formed which is extended over an entire circumference. The height of the circumferential rib 30M is a little smaller than the depth of the inner circumferential groove 21M of the housing fixing portion 21 (FIG. 2). Further, the axial thickness D of the circumferential rib 30M is a little smaller than the axial length J of the bottom part of the inner circumferential groove 21M. However, when it is assumed that the height of the vertical protrusion 21V of the housing fixing portion 21 that protrudes from the side wall is H, the axial thickness D is formed to be slightly larger than the different J−H between the axial length J and the height H. Namely, a relation expressed by "J>D>(J−H)" is set.

Respectively at the one parts of both ends of a diameter passing a center of the circumferential rib 30M, the axial ribs 30L are formed which are connected to the circumferential rib 30M. The axial length of the axial rib 30L is equal to the axial length of the axial groove 21L formed on the housing fixing portion 21. Further, the circumferential length (the transverse width) of the axial rib 30L is equal to the transverse width of the axial groove 21L.

In order to accommodate and fix the charging connector housing 30 to the housing fixing portion 21, the circumferential rib 30M of the charging connector housing 30 is accommodated in the inner circumferential groove 21M of the housing fixing portion 21 of the separated case 20a, and the axial rib 30L of the charging connector housing 30 is accommodated in the axial rib 21L of the housing fixing portion 21 of the separated case 20a. At that time, since the difference obtained by subtracting the protruding height H of the vertical protrusions 21V formed in the inner circumferential groove 21M of the housing fixing portion 21 from the axial length J of the bottom part of the groove is slightly smaller than the axial thickness D of the circumferential rib 30M, when the circumferential rib 30M is accommodated in the inner circumferential groove 21M of the housing fixing portion 21, the protruding height H of the vertical protrusions 21V is slightly deformed to accommodated and fix the circumferential rib 30M to the inner circumferential groove 21M. In the present invention, the vertical protrusions 21V of the housing fixing portion 21 are deformed to some degree by the circumferential rib 30M of the charging connector housing 30 so that an axial or diametrical backlash may be suppressed.

Figure 4A:
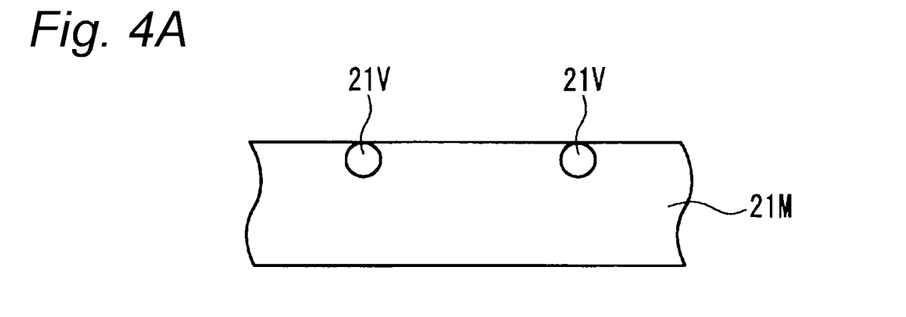
FIG. 4A is a partial plan view of an inner circumferential groove of the housing fixing portion before the charging connector housing is fixed to the housing fixing portion.
Figure 4B:
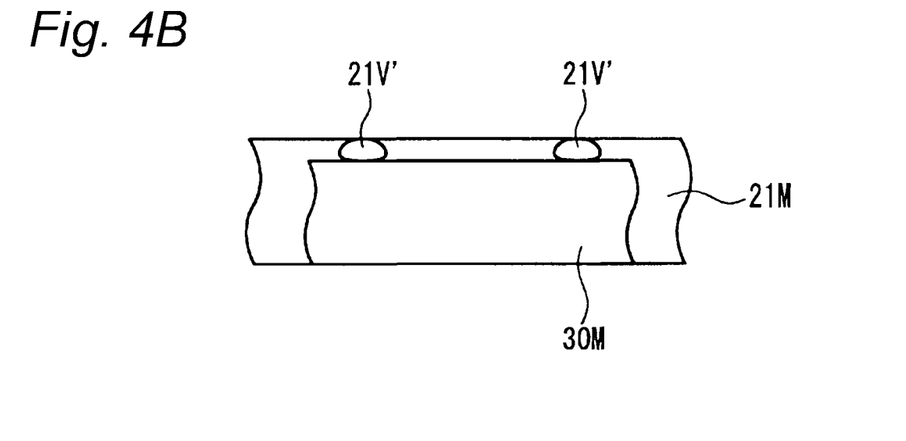
FIG. 4B is a partial plan view of the inner circumferential groove of the housing fixing portion after the charging connector housing is fixed to the housing fixing portion.

FIG. 4A is a partial plan view of the inner circumferential groove 21M of the housing fixing portion 21 before the charging connector housing 30 is accommodated and fixed to the housing fixing portion 21. FIG. 4B is a partial plan view of the inner circumferential groove 21M of the housing fixing portion 21 after the charging connector housing 30 is accommodated and fixed to the housing fixing portion 21.

Before the charging connector housing is accommodated in the housing fixing portion as shown in FIG. 4A, the vertical protrusions 21V formed in the side wall of the inner circumferential groove 21M of the housing fixing portion 21 are not yet deformed. However, after the charging connector housing is accommodated and fixed to the housing fixing portion as shown in FIG. 4B, when the vertical protrusions 21V are engaged with the circumferential rib 30M of the charging connector housing 30 to deform parts in the vicinity of top parts to some degree, the vertical protrusions 21V are deformed like deformed vertical protrusions 21V'. Accordingly, an axial and diametrical backlash is assuredly suppressed.

Further, in the present invention, since the axial protrusions 21T are formed in the plurality of positions in the housing fixing portion 21 similarly to the conventional charging connector, when the separated cases 20a and 20b are assembled, the axial protrusions 21T abut on the outer periphery of the charging connector housing 30 as shown in FIG. 6 to prevent a movement (a backlash) thereof. When the backlash is completely eliminated, in the case of the conventional charging connector, the height of the triangular protrusions 52T is increased to increase an amount of lap. However, in the present invention, since the vertical protrusions 21V are provided and the vertical protrusions 21V are deformed to some degree to suppress the axial and diametrical backlash, even when the height of the triangular protrusions 52T is not increased, the diametrical backlash can be sufficiently suppressed. Thus, the height of the triangular protrusions 52T is not excessively increased, so that an unexpected situation does not occur that the right and left separated cases 20a and 20b are not completely closed As described above, according to the present invention, since the circumferential rib deforms the top parts of the vertical protrusions and is engaged with the inner circumferential groove, the backlash between the charging connector housing and the case can be prevented.

Further, since the axial protrusions that prevent the backlash between the connector housing and the case do not need to excessively increase an amount of lap according to the effect of the invention of the first aspect, when the right and left separated cases are completely closed, a gap is not formed between case main bodies.

Since the axial rib is engaged with the axial groove, a circumferential backlash between the connector housing and the case is prevented.

In the above-described exemplary embodiment, the charging connector housing is described, however, the present invention is not limited to the charging connector housing and may be applied to other connector housing.

The present invention is useful to provide a connector which can prevent a backlash between a connector housing and a case and does not form a gap between a pair of separated cases so that the separated cases are completely closed.

What is claimed is:

1. A connector comprising:
a connector housing having a cylindrical shape and configured to be fitted to a mating housing; and
a case including a housing fixing portion having a cylindrical shape therein, wherein
the housing fixing portion includes a first rib which extends in a circumferential direction of the housing fixing portion and is formed on an inner circumferential face of the housing fixing portion,
the connector housing includes a second rib which extends in a circumferential direction of the connector housing and is formed on an outer circumferential face of the connector housing,
an inner circumferential groove which extends in the circumferential direction of the housing fixing portion is formed on an inner circumferential face of the first rib, so that the second rib is inserted into the inner circumferential groove, and
vertical protrusions which extend in an inserting direction of the second rib are formed at a plurality of positions on at least one of vertical side walls defining the inner circumferential groove, so that top parts of the vertical protrusions are deformed so as to engage the second rib with the inner circumferential groove when the second rib is inserted into the inner circumferential groove.

2. The connector as set forth in claim 1, wherein
a plurality of axial protrusions which extend in an axial direction of the housing fixing portion are formed in a plurality of positions on the inner circumferential face of the first rib so as to prevent a backlash between the connector housing and the case.

3. The connector as set forth in claim 1, wherein
an axial groove extending in the axial direction of the housing fixing portion is formed in the inner circumferential face of the first rib, and
an axial rib extending in the axial direction is formed the outer circumferential face of the connector housing so as to be engaged with the axial groove.

4. The connector as set forth in claim 1, wherein
the first rib and the inner circumferential groove are provided in entire inner circumference of the housing fixing portion, and
the second rib is provided in entire outer circumference of the connector housing.

5. The connector as set forth in claim 1, wherein
the case is formed by a pair of separated cases.

6. The connector as set forth in claim 1, wherein the inner circumferential groove is positioned more inwardly in the case than the first rib.

7. The connector as set forth in claim 3, wherein the inner circumferential groove is positioned more inwardly in the case than the first rib.

8. The connector as set forth in claim 7, wherein the vertical protrusions extend more vertically with respect to the case than the axial protrusions.

* * * * *